US007270603B2

(12) United States Patent
Duhamel

(10) Patent No.: US 7,270,603 B2
(45) Date of Patent: Sep. 18, 2007

(54) REVERSE-ORDER GAME PLAY APPARATUS

(75) Inventor: Gérald Duhamel, Drummondville (CA)

(73) Assignee: Labtronix Concept Inc., Drummondville, Quebec (CA)

(*) Notice: Subject to any disclaimer, the term of this patent is extended or adjusted under 35 U.S.C. 154(b) by 583 days.

(21) Appl. No.: 10/364,673

(22) Filed: Feb. 12, 2003

(65) Prior Publication Data

US 2003/0232642 A1 Dec. 18, 2003

Related U.S. Application Data

(60) Provisional application No. 60/355,850, filed on Feb. 12, 2002.

(51) Int. Cl.
*G06F 17/00* (2006.01)

(52) U.S. Cl. .......... 463/16

(58) Field of Classification Search .......... 463/16, 463/17, 18, 19, 20, 25, 30, 31, 46, 9–13; 273/138.1, 138.2, 139, 143 R, 269, 271
See application file for complete search history.

(56) References Cited

U.S. PATENT DOCUMENTS 4,033,588 A * 7/1977 Watts .......... 463/18
4,833,307 A * 5/1989 Gonzalez-Justiz .......... 235/375
5,186,463 A * 2/1993 Marin et al. .......... 463/27
5,192,076 A * 3/1993 Komori .......... 463/18
5,265,880 A * 11/1993 Maksymec .......... 273/269
5,326,104 A * 7/1994 Pease et al. .......... 463/18
5,417,424 A * 5/1995 Snowden et al. .......... 463/18
5,472,196 A * 12/1995 Rusnak .......... 463/18
5,494,293 A 2/1996 Goldfarb
5,505,449 A * 4/1996 Eberhardt et al. .......... 463/29
5,580,311 A * 12/1996 Haste, III .......... 463/17
5,722,890 A * 3/1998 Libby et al. .......... 463/17
5,927,716 A 7/1999 Goodson et al.
6,099,407 A * 8/2000 Parker et al. .......... 463/19
6,102,400 A * 8/2000 Scott et al. .......... 273/269
6,168,521 B1 * 1/2001 Luciano et al. .......... 463/18
6,183,361 B1 * 2/2001 Cummings et al. .......... 463/18
6,315,291 B1 * 11/2001 Moody .......... 273/139
6,398,646 B1 * 6/2002 Wei et al. .......... 463/19
6,402,614 B1 * 6/2002 Schneier et al. .......... 463/17
6,425,823 B1 * 7/2002 Byrne .......... 463/16
6,447,395 B1 * 9/2002 Stevens .......... 463/18
6,616,531 B1 * 9/2003 Mullins .......... 463/19

(Continued)

*Primary Examiner*—Robert E Pezzuto
(74) *Attorney, Agent, or Firm*—Ogilvy Renault LLP

(57) ABSTRACT

The invention is a method but particularly a system for the play of a game lying between a common-draw live game and an instant game. Furthermore, the same method and system may profit of the down time reserved to the sale of tickets in a live game. Accordingly, the basic embodiment of this system includes: a) a draw storage medium registering draw information; b) a period controller signaling start- and end-distribution periods with no change of draw information available during one distribution period; c) a distribution module providing tickets to players upon request; d) a game controller providing the requisite Graphical User Interface (GUI) for playing the game; switching to a play mode in response to a start-distribution period signal; receiving player's inputs; providing game outputs including ticket and draw representations; and switching to an idle mode in response to an end-distribution period signal; and e) a ticket evaluation module comparing ticket information to draw information in order to determine the ticket value.

26 Claims, 4 Drawing Sheets

U.S. PATENT DOCUMENTS 6,733,385 B1 5/2004 Enzminger et al.
6,783,456 B2 * 8/2004 White .......................... 463/18
6,899,622 B2 * 5/2005 Lind et al. .................... 463/17
2003/0034605 A1 * 2/2003 Hunter et al. ............ 273/138.1

* cited by examiner

REVERSE-ORDER GAME PLAY APPARATUS

CROSS-REFERENCE TO RELATED APPLICATION

This application claims priority of U.S. provisional patent application Ser. No. 60/355,850, filed on Feb. 12, 2002 and entitled "Method of Playing a Keno Game". The entire content of said provisional application is incorporated herein by reference.

FIELD OF THE INVENTION

The invention is a method and a system for playing a game lying between a common-draw live game and an instant game. Furthermore, such a method and system may take advantage of the down time reserved to the sale of tickets in a live game.

BACKGROUND OF THE INVENTION

Keno, state lotteries and other kinds of live games are well known and very popular. Players purchase tickets during a purchase period to participate in the game. The tickets identify a number, numbers or symbols. A scheduled draw is completed that allows players to compare the numbers or symbols on their tickets to the draw result; which may result in a prize or award being won.

Instant games are also well known. In practice, players purchase tickets containing concealed information. The tickets are manufactured with the game outcome predetermined and identified on the tickets. Once a ticket is bought, players can reveal its information and determine its value. When tickets bear winning information, players can redeem tickets for prizes. Instant games are played either in paper or electronic versions.

U.S. Pat. No. 5,265,880 to Maksymek describes a game using a draw of 48 to 55 bingo balls prior to the sale of bingo cards having concealed numbers. The draw information is known to players at the time of purchasing the cards. Once the draw is completed, players uncover the bingo numbers to compare them to the draw to determine the occurrence of a "cover-all" or "black out". If the comparison between a player's card and the draw results in a "cover all", the player wins the prize. A new draw is done when a predetermined time has elapsed, regardless of the occurrence of a cover-all.

OBJECTS OF THE INVENTION

One object of the invention is to benefit from the "downtime" occurring between two draws in a game having a regular or predetermined draw schedule to sell concealed electronic tickets that can be compared to a draw to evaluate prizes. The "downtime" may be scheduled by an external-game draw schedule, by prescheduled draws applied exclusively to the actual game, or by non-scheduled draws applied exclusively to the actual game and wherein a new draw is triggered by the occurrence of a particular event.

An object of the invention is to provide a game wherein the outcome of a game depends on a result generated for and shared by a plurality of players, wherein the game has the advantage of being played as an instant game independently of the fact that a game lasts for a significant period.

Another object of the invention is to take advantage of the confidence created by a regulated or closely monitored game to provide a new game offering the desired level of confidence to players.

Another object of the invention is to create an increased level of confidence via the generation of concealed electronic cards before, and independently of, the draw used to determine play outcomes.

Another object of the invention is to provide system and gaming apparatuses that are suitable for the playing of such game.

Another object of the invention is to provide a system providing monitoring and communication between the different means of the system.

Another object of the invention is to provide the requisite system for good monitoring and auditing of the playing of such game.

Still, one secondary object of the invention is to allow players to have a variety of play options when possible; such as the ones available in a live game or electronic game of the same kind. For instance, in a keno game, players could choose to purchase cards containing from three to ten concealed numbers. The value of the potential prizes would vary accordingly.

Another object of the invention is to provide a system that is not prejudicial to the main live game when it depends from such live game. Rather, the system may profit of the downtime between draws without influencing live-game ticket sales.

SUMMARY OF THE INVENTION

According to these objects, the invention consists in a method and particularly a system for the play of an instant game based on the outcome of a game that is determined before the play of the instant game. The game is processed via the sale of concealed tickets bearing game indicia; wherein determination of the outcome depends on revealing ticket information.

The method for the play of such an instant game includes the following steps:

a) Monitoring, registering and/or generating a draw result.
b) Signaling a start-distribution period.
c) Distributing upon request concealed tickets to players, wherein the determination of the ticket outcome depends on the comparison between the ticket information and the draw.
d) Awarding prizes to winning players according to the comparison result.
e) Stopping the distribution of concealed tickets (and therefore the actual game) when at least one of the following situations occurs: scheduled game-end, or event corresponding to an end criterion.
f) Idling the system until a new game-start signal and draw result are received (which may be instantaneous), which triggers the start of the distribution of new concealed tickets active for and only for the new game.

The typical system for the play of such a game may be composed of a game server, a plurality of gaming apparatuses and a network maintaining communication between the apparatuses and the game server. Within that configuration, the game server maintains central information and distributes information upon demand from apparatuses. On the other hand, the apparatuses allow the play of the game.

For a disclosure purpose, the invention is hereby illustrated via two distinctive applications: a system depending on an external scheduled live-game wherein the concealed electronic tickets are randomly generated upon request; and a system with self-managed draw schedule wherein a population of tickets are already present on the game server and consumed upon request. The latter system has the advantage of offering a monitoring of distributed tickets with a method of preventing a ticket to be distributed twice during a single game.

Nevertheless, the environment of play and the form of the concealed ticket used for that play are not limited to the above-described systems; paper or electronic ticket formats may be used, the play environment may be a raw environment requiring almost only human resources or even an electronic environment wherein almost no human resources are required. Even the type of live game does not limit the invention; the game providing draw results may vary from a self-managed draw system, to a local keno game, and even to a state or national lottery game.

The invention also provides a computer program product for the play of an instant game wherein play evaluation depends on comparison between instant-game ticket information and draw information, the draw information being common to a plurality of instant-game tickets, the program product including program instructions for registering draw information in a draw storage medium, providing instant-game ticket information upon request, providing a Graphical User Interface (GUI) providing requisite environment for players' inputs, outputs, and a game representation comprising ticket information and draw information, evaluating instant-game ticket value via comparison of instant-game ticket information to draw information in order to resolve ticket value, wherein a winning instant-game ticket results in one of a plurality of ticket values, awarding instant-game ticket value; and switching to a new game upon occurrence of an end-game criterion.

BRIEF DESCRIPTION OF THE DRAWINGS

These and other aspects and advantages of the present invention will become better understood in light of the following detailed description of preferred embodiments with reference to the accompanying drawings, in which.

DETAILED DESCRIPTION OF THE PREFERRED EMBODIMENTS

As stated, the invention consists in a system and method for the play of a game related to an instant game but depending on an outcome of a live game. For explanation purposes, the first embodiment uses a live keno game played in a casino.

First Embodiment

Keno games are usually played via buying tickets. Players select from three (3) to ten (10) numbers on a keno ticket bearing eighty (80) numbers. Players register their keno ticket at a register counter against a fixed fee. At a scheduled time, a draw of twenty (20) numbers is completed. Players compare their numbers to the draw. When the quantity of matches between the player's numbers and the draw corresponds to a winning criterion, the player redeems his ticket for his prize.

The invention, to profit of the time between two draws (wherein players usually buy at most a few tickets), uses electronic concealed tickets sold on electronic gaming apparatuses. When receiving one ticket, a player reveals the concealed information, compares the ticket information to the last draw, and may redeem the ticket based on a winning comparison.

A short time before a scheduled draw, the ticket sale ends to prevent confusion regarding the ticket/draw combination. In addition, draw (or game) identification is provided on the tickets to prevent the redemption of a wrong ticket/draw combination.

The preferred environment for the play of such game is via electronic gaming apparatuses. These apparatuses are maintained in communication by a network with a game server and live keno system.

Figure 1:
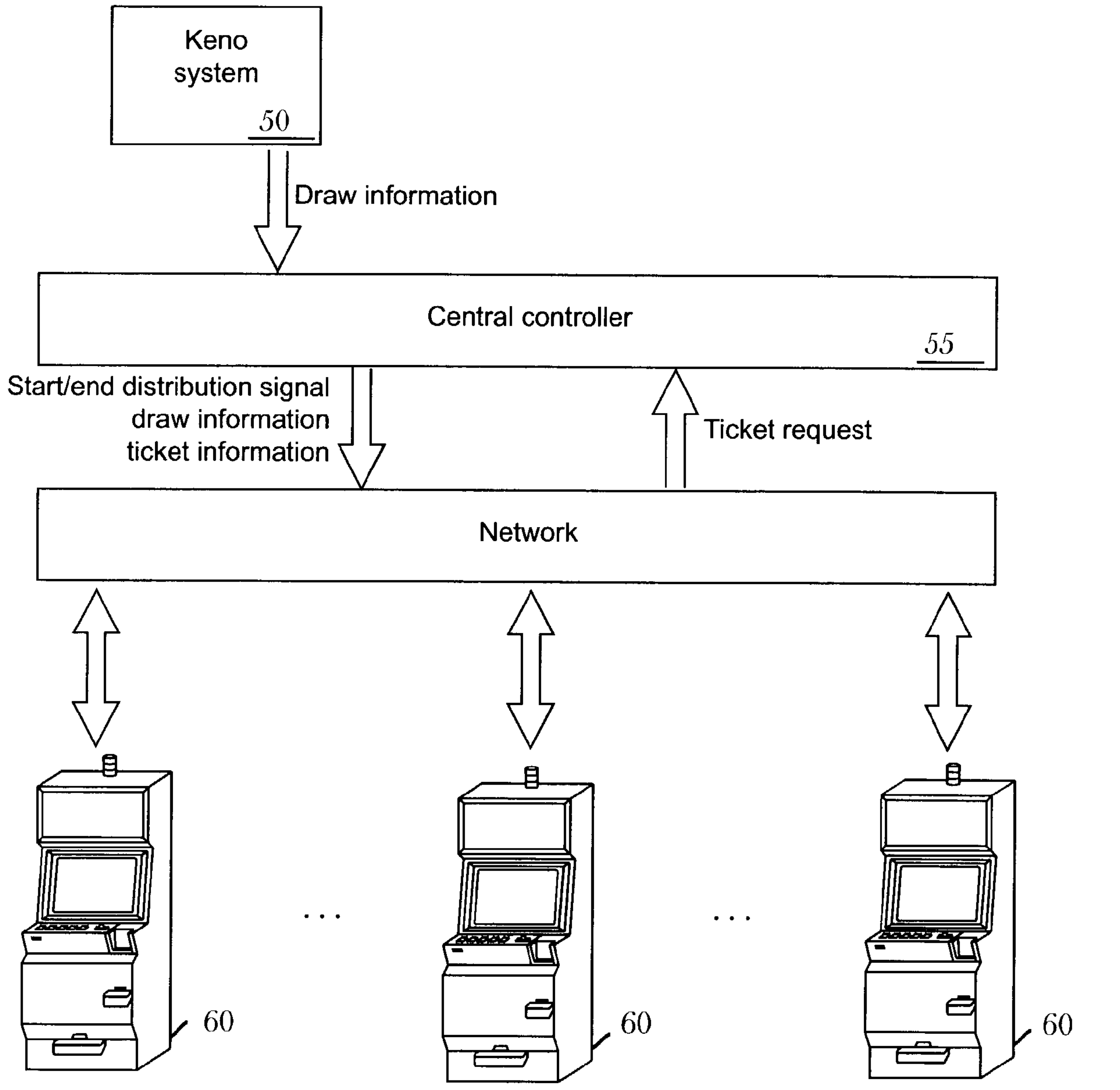
FIG. 1 is a schematic representation of a gaming system according to the first embodiment.

FIG. 1 illustrates the gaming system. The keno system 50 provides keno outcomes. On the other hand, the system of the invention is composed of a central controller 55 managing central information and in communication with a plurality of gaming apparatuses 60 wherein players may play the game.

Figure 2:
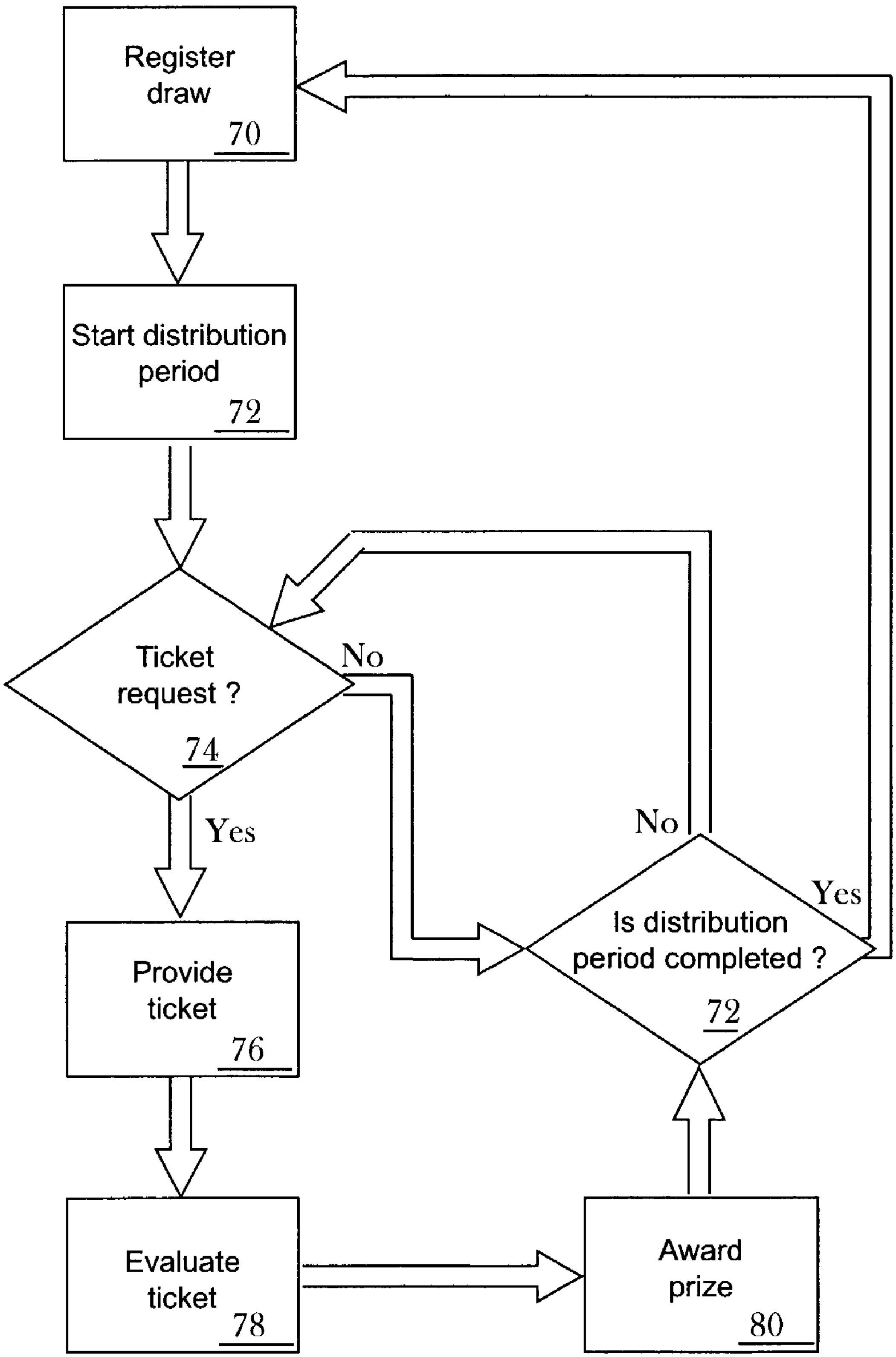
FIG. 2 is a flow chart illustrating the steps of the current method.

FIG. 2 provides a schematic illustration of the requisite steps for the play of such game. When a keno draw is completed, the live keno system transmits the draw result to the game server, which transmits the draw information 70 plus a start-distribution signal 72 to the gaming apparatuses. At this time, the apparatuses display a play invitation to players with the identification of the draw.

Players insert credits in the apparatus and request 74 concealed electronic tickets. Upon request, the game server generates tickets and transmits 76 them to the requesting apparatus. The apparatus displays the ticket, reveals ticket information and compares ticket information to the draw information 78. When a winning comparison occurs, the player is awarded a prize 80. Such game and process issue an instant-like game.

A short time before a scheduled draw, the game server sends an end-distribution signal 82 to gaming apparatuses. In response, the apparatuses stop providing tickets and switches into an idle mode. During this time, the game server waits for a new draw information, registers the draw information 70 upon reception, and sends the new draw information and a start-distribution signal 72 to the apparatuses. This signal triggers the start of a new game.

Figure 3:
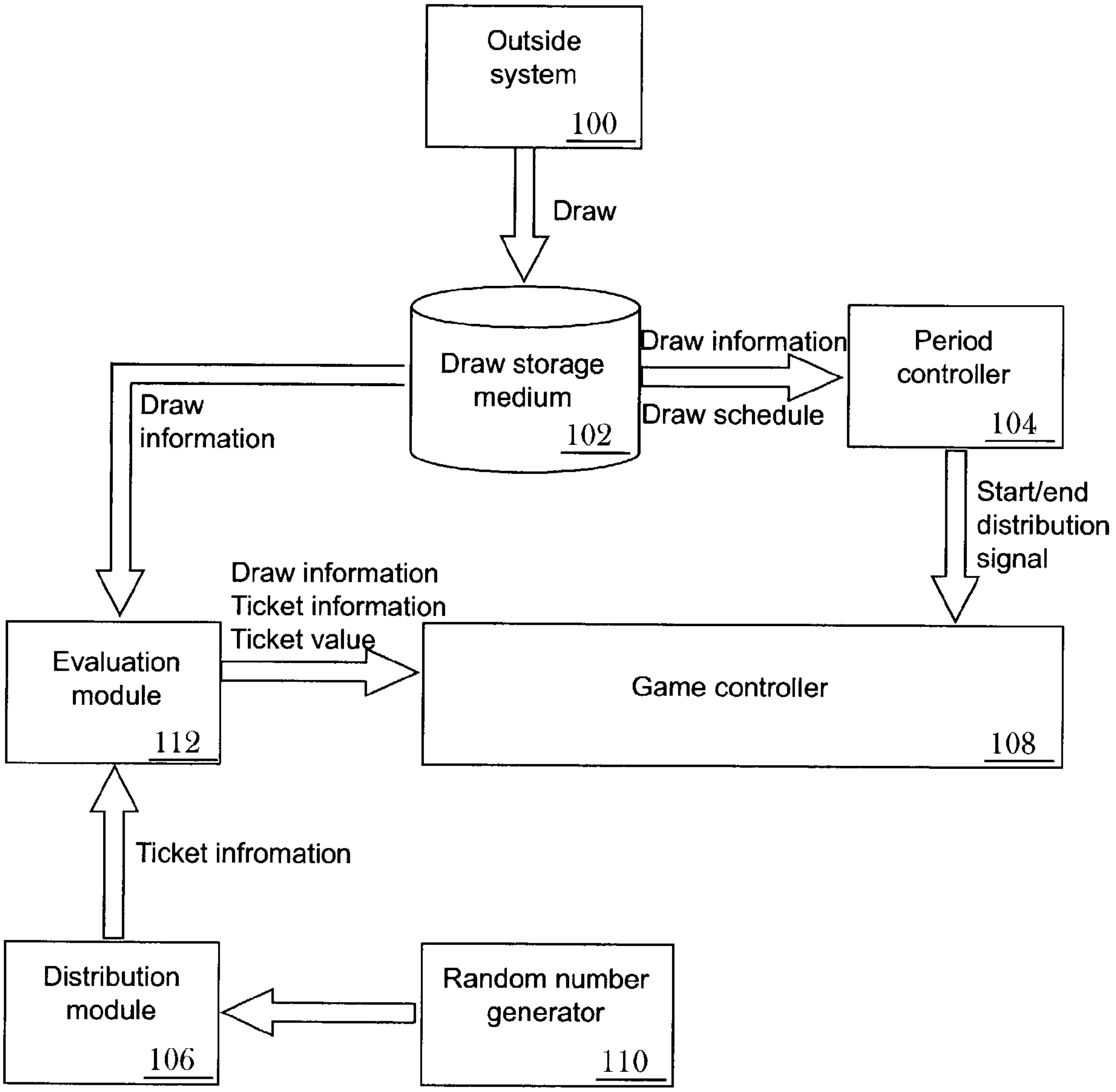
FIG. 3 is a block diagram representing components of the system according to the first embodiment.

FIG. 3 is a block diagram illustrating the system-participating components. The keno system 100 provides draw information to a draw storage medium 102. This medium 102 transmits information to an evaluation module 112 and a period controller 104. In order to play a ticket, a game controller 108 transmits a ticket request to a distribution module 106, which generates a ticket using a random number generator 110. This ticket is transmitted to the evaluation module 112. This evaluation module 112 evaluates the ticket value and transmits information to the game controller 108, which provides a representation of the game to the player. The game controller 108 also receives start- and end-distribution signals, inputs from players such as ticket requests, and game outputs such as ticket values.

To play the game, players may actually select a ticket type, which may comprise from three to ten numbers. The available prizes differ according to the ticket type selected.

Second Embodiment

The second embodiment consists in an autonomous game; it does not depend on a live game for the generation of draws. The game server self-generates draws when needed. Yet, another difference is a list of concealed electronic tickets stored in a storage medium and distributed to gaming apparatuses upon request. Finally, the game server compares concealed information to the draw before distribution to audit play information.

Regardless of the above differences, gaming apparatuses accomplish the same functions.

A game starts when the game server generates a draw. This draw is registered and sent to the gaming apparatuses with a start-distribution signal. In response, the gaming apparatuses render the consumption of tickets available. Players purchase tickets. The ticket request is sent to the game server. The game server selects tickets (either randomly or in a predetermined order with tickets being shuffled before starting the game), marks the ticket as consumed, and sends the ticket information to the requesting gaming apparatuses. Ticket information is revealed, compared to the draw, and a prize is awarded to winning players.

A short time before a game end or upon end-criterion monitoring, the game server sends an end-distribution signal to the gaming apparatuses, which ends the distribution and make the gaming apparatuses shift to an idle mode waiting for a new start-distribution signal. Based on configuration, a new game may be initiated automatically.

Figure 4:
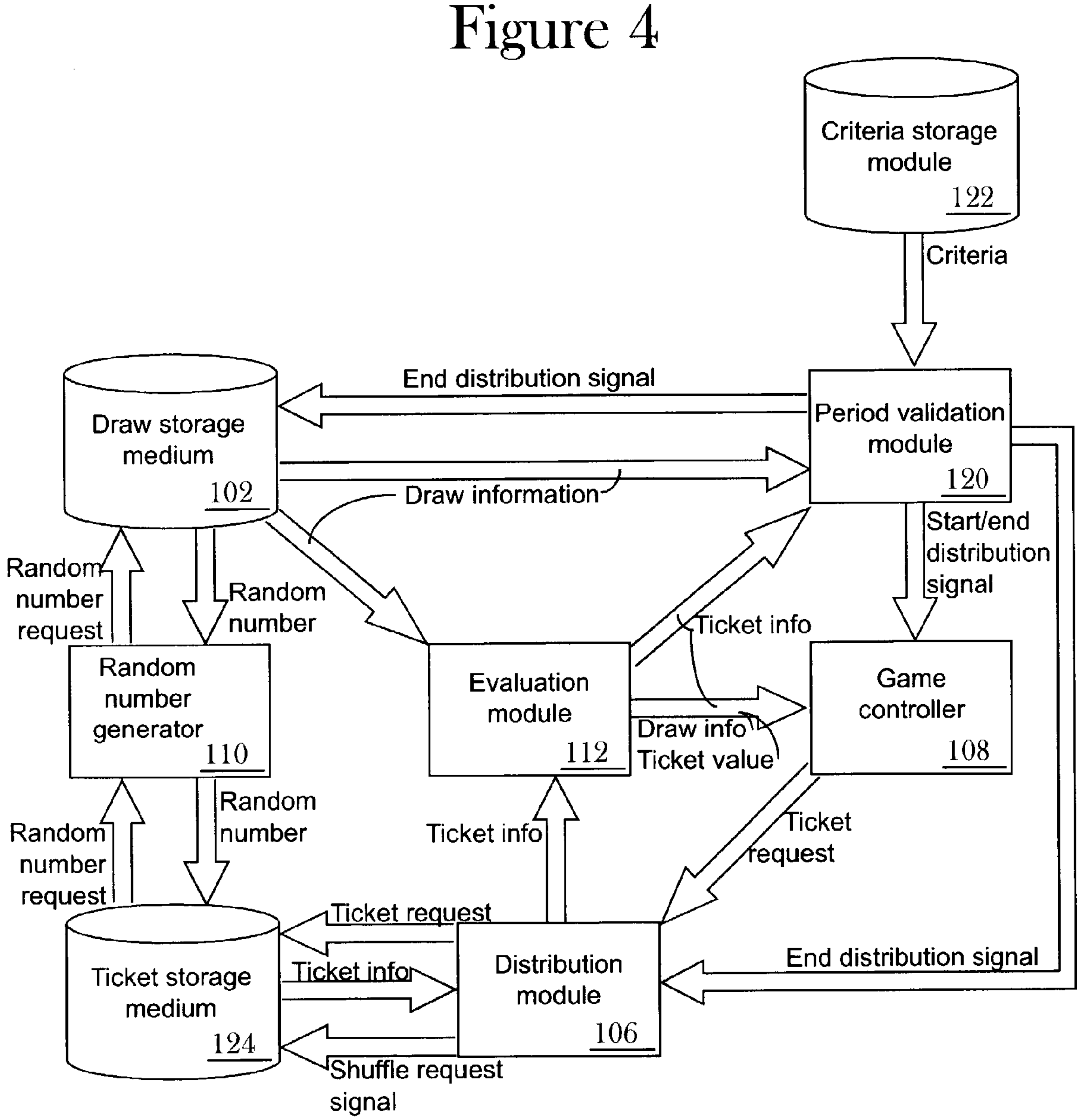
FIG. 4 is a block diagram representing components of the system according to the second embodiment.

FIG. 4 illustrates the system components according to the last embodiment. A random number generator 110 provides the numbers used to generate draws and shuffles/selects tickets upon request. A draw storage medium 102 keeps a record of the draw information. A ticket storage medium 124 keeps a list of tickets and transmits them to a distribution module 106 upon request, which sends them to an evaluation module 112. The evaluation module 112 compares the draw information to the ticket information, determines the ticket value, and sends the information to a game controller 108 and a period validation module 120. The game controller 108 allows playing the game, while the period validation module 120 monitors end-period criteria 122 and transmits the information to the components that need this information.

Distribution alternatives exist. For instance, instead of storing a big population of tickets, tickets may be randomly generated upon demand and a monitoring memory may keep a list of the distributed tickets to prevent distributing the same ticket twice during a single game.

Furthermore, the end of a game may be determined by the occurrence of a predetermined event; this trigger event may be based on ticket values. For instance, a game may end when a playtime has elapsed, the total distributed prize reaches a threshold value, an odd criterion such as the occurrence of a card with the sum of the first four numbers equaling the sum of the first four numbers of the draw. With the last two alternatives, the game server detects an game-ending outcome, transmits an end-distribution signal to all apparatuses, generates a new draw for the next game, and sends a start-distribution signal and the new draw information to the apparatuses to start a new game. Based on preferences, either the game server or all gaming apparatuses may monitor game-ending criteria.

Furthermore, the invention may be embodied on different types of gaming apparatuses; from standard casino gaming apparatuses to hand-held computers. The game format may vary from lotto, keno or bingo without departing from the scope of the invention.

Accordingly, while the invention has been described in connection with the specific embodiments thereof, it will be understood that it is capable of further modifications. It is the intend to cover any variations, uses, or adaptations of the invention following, in general, the principles of the invention and including such departures from the present disclosure as come within known or customary practice within the art to which the invention pertains. These applications will find their essential features herein set forth in the scope of the appended claims.

The invention claimed is:

1. A method of playing of an instant game wherein payout evaluation depends on comparison between electronic instant-game ticket information and a draw result common to a plurality of instant-game tickets, said method comprising steps of:

registering said draw result before beginning distributing instant-game tickets;

establishing a plurality of payout conditions based on said draw result, said payout conditions defining a ticket value having one of plurality of winning values;

beginning distributing said instant-game tickets containing said information to a plurality of players;

providing to said plurality of players a game representation comprising said information and said draw result;

comparing said information to said draw result in order to resolve said ticket value for said plurality of players;

awarding said resolved ticket value to said players;

determining an end-of-game criterion; and starting a new game upon occurrence of said end-of-game criterion.

2. The method of claim 1, wherein said end-of-game criterion is one of a scheduled time point and a scheduled elapsed time.

3. The method of claim 1, wherein said determining said end-of-game criterion comprises:

monitoring said distributing of instant-game tickets; and evaluating said ticket to detect distribution of a ticket corresponding to a final-ticket criterion.

4. The method of claim 1, further comprising steps of:

signaling a start-distribution period after said step of registering a draw result; and signaling an end-distribution period after occurrence of said end-of-game criterion, wherein a time between signaling a start-distribution period and an end-distribution period is used to register a new draw result.

5. The method of claim 1, further comprising generating a draw result.

6. The method of claim 1, further comprising receiving a draw result from a principal game, wherein said instant game is an auxiliary game that does not participate in the principal game.

7. The method of claim 1, wherein said step of distributing comprises preventing two game tickets containing the same game information from being distributed within a same game.

8. The method of claim 1, wherein said step of distributing comprises receiving a purchase fee for said tickets.

9. The method of claim 1, wherein said game tickets are electronically generated upon request.

10. The method of claim 1, wherein said game representation is provided in a video format.

11. The method of claim 1, wherein said game representation is provided on a printed medium.

12. The method of claim 1, wherein said steps are performed in sequence.

13. The method of claim 1, wherein said instant game is one of lotto, keno, and bingo.

14. The method of claim 1, wherein said draw result is composed of at least one of numbers, cards, symbols, dice rolls, or colors.

15. A method of playing an auxiliary game depending on a draw result from a principal game and wherein outcome evaluation is based on comparison between auxiliary-game ticket information and a principal-game draw result, said principal game involving a series of draw results being presented to players in said principal game with an idle period following each one of said draw results before commencement of a following one of said draw results, said method comprising steps of:

registering an immediate past one of said draw results before beginning distributing auxiliary-game tickets;

during said idle period, distributing said auxiliary-game tickets containing said information for use with said immediate past draw result, and providing a game representation comprising said play information and said current principal-game draw result to a plurality of players in said auxiliary game;

comparing said information to said immediate past draw result in order to resolve said ticket value for said plurality of players; and awarding said resolved ticket value to said players.

16. The method of claim 15, wherein said idle period is set to a scheduled time prior to said following draw result.

17. The method of claim 15, further comprises preventing distributing two game tickets containing the same game information within a period between two subsequent principal-game draws.

18. The method of claim 15, wherein auxiliary-game tickets are electronically generated upon request.

19. The method of claim 15, wherein auxiliary-game tickets are data packets, which are provided for their play either in a video format or a printout format.

20. The method of claim 15, wherein said principal game is one of a lotto, keno and bingo.

21. The method of claim 15, wherein the information contained on the auxiliary-game ticket is equal or superior in volume of game indicia than the number of game indicia provided by the principal-game draw result.

22. A gaming system for the play of an instant game wherein play evaluation depends on comparison between instant-game ticket information and draw information, said draw information being common to a plurality of instant-game tickets, said gaming system being characterized by:

a draw storage medium registering draw information;

a distribution module providing tickets upon request;

a game controller providing a Graphical User Interface (GUI) for playing the game, receiving players' inputs, and providing game outputs, said GUI providing a game representation comprising instant-game ticket information and draw information; and a ticket evaluation module comparing ticket information to draw information in order to determine ticket value, wherein winning ticket may result in one of a plurality of winning values, wherein said distribution module may provide said tickets upon request only after said draw information is registered in said draw storage medium.

23. The gaming system of claim 22, further comprising at least one of:

a random number generator;

a draw generator generating a draw based on random number generator information;

a ticket-generating module that generates instant-game ticket upon request based on random number generator information;

a ticket storage medium registering a list of instant-game tickets available to be distributed;

a ticket monitoring module that monitors ticket distribution and prevents distributing two instant-game tickets with the same information within a distribution period being between two registration of draw information; and a communication module.

24. The gaming system of claim 22 wherein the gaming system components are divided between at least two gaming apparatuses communicating via a network, with a first apparatus being a central apparatus and a second apparatus being a play apparatus.

25. The gaming system of claim 22 further comprising a period validation module monitoring distribution in order to trigger a new game period using different draw information.

26. The gaming system of claim 22 that further comprises a credit payment module receiving credit information from players, validating credit information and transmitting credit information to the gaming module.

* * * * *